United States Patent
Bacon et al.

(10) Patent No.: US 10,236,683 B2
(45) Date of Patent: Mar. 19, 2019

(54) CORROSION MITIGATION FOR AN EXTERNAL CONNECTOR OF AN ELECTRONIC DEVICE

(71) Applicant: Apple Inc., Cupertino, CA (US)

(72) Inventors: Roderick D. Bacon, San Francisco, CA (US); Nagendra Bage Jayaraj, San Jose, CA (US); Derek J. DiCarlo, San Jose, CA (US); Chi Kin Ho, Milpitas, CA (US); Xingqun Li, San Jose, CA (US); Jahan C. Minoo, San Jose, CA (US); Surya Musunuri, San Jose, CA (US); Tony Chi Wang Ng, Santa Clara, CA (US); Carlos Ribas, Los Altos, CA (US); Ching Yu John Tam, Los Gatos, CA (US); Evan J. Thompson, Sunnyvale, CA (US); Daniel C. Wagman, Scotts Valley, CA (US); Di Zhao, Santa Clara, CA (US); Robert D. Zupke, San Jose, CA (US)

(73) Assignee: Apple Inc., Cupertino, CA (US)

(*) Notice: Subject to any disclaimer, the term of this patent is extended or adjusted under 35 U.S.C. 154(b) by 236 days.

(21) Appl. No.: 15/256,409

(22) Filed: Sep. 2, 2016

(65) Prior Publication Data
US 2017/0358922 A1    Dec. 14, 2017

Related U.S. Application Data

(60) Provisional application No. 62/348,656, filed on Jun. 10, 2016.

(51) Int. Cl.
*H02H 9/04* (2006.01)
*H01R 13/66* (2006.01)
(Continued)

(52) U.S. Cl.
CPC .......... *H02H 9/04* (2013.01); *G06F 13/4068* (2013.01); *H01R 13/6683* (2013.01);
(Continued)

(58) Field of Classification Search
CPC ............. H02H 3/20; H02H 3/207; H02H 9/04
(Continued)

(56) References Cited

U.S. PATENT DOCUMENTS

| | | |
|---|---|---|
| 8,107,209 B2 | 1/2012 | Simon |
| 8,708,745 B2 | 4/2014 | Golko et al. |
| 8,886,971 B2 | 11/2014 | Chuang |
| 8,913,771 B2 | 12/2014 | Filson et al. |
| 9,300,773 B2 | 3/2016 | Mittleman et al. |
| 9,335,355 B2 | 5/2016 | Menzel et al. |

(Continued)

FOREIGN PATENT DOCUMENTS

| | | |
|---|---|---|
| EP | 2390673 | 11/2011 |
| JP | 2004235724 | 8/2004 |

OTHER PUBLICATIONS

EP-2390673; Entire specification and drawings and claims.*
(Continued)

*Primary Examiner* — Dharti H Patel
(74) *Attorney, Agent, or Firm* — Kilpatrick Townsend & Stockton LLP

(57) ABSTRACT

A voltage of a first pin that is one of several pins of an external connector of a system is measured, while the first pin is un-driven except for being pulled to ground through a first resistance, and a second pin of the external connector is being used as a power supply rail of the system. The measured voltage is compared to a short circuit threshold and in response to that threshold being exceeded, the power supply voltage on the second pin is reduced. In such an embodiment, no test stimulus needs to be applied to any of the pins of the external connector. Other embodiments are also described and claimed.

26 Claims, 8 Drawing Sheets

(51) Int. Cl.
  *H01R 13/713* (2006.01)
  *H01R 24/60* (2011.01)
  *G06F 13/40* (2006.01)
  *H04L 12/40* (2006.01)
  *H01R 107/00* (2006.01)

(52) U.S. Cl.
  CPC ........... *H01R 13/713* (2013.01); *H01R 24/60* (2013.01); *H04L 12/40045* (2013.01); *H01R 2107/00* (2013.01)

(58) Field of Classification Search
  USPC .......................................................... 361/86
  See application file for complete search history.

(56) References Cited

U.S. PATENT DOCUMENTS

| | | |
|---|---|---|
| 2005/0265009 A1 | 12/2005 | Fussinger et al. |
| 2008/0165460 A1 | 7/2008 | Whitby-Strevens |
| 2010/0165528 A1 | 7/2010 | Chan |
| 2014/0181328 A1 | 6/2014 | Terlizzi et al. |
| 2014/0191588 A1 | 7/2014 | Stevens |
| 2016/0080553 A1 | 3/2016 | Dempster et al. |

OTHER PUBLICATIONS

International Search Report and Written Opinion for PCT/US2017/032433, dated Aug. 16, 2017, 10 pages.
International Preliminary Report on Patentability for PCT/US2017/032433, dated Dec. 20, 2018, 7 pages.

* cited by examiner

CORROSION MITIGATION FOR AN EXTERNAL CONNECTOR OF AN ELECTRONIC DEVICE

This application claims the benefit of the earlier filing date of U.S. Provisional Patent Application No. 62/348,656, filed Jun. 10, 2016.

FIELD

An embodiment of the invention relates to techniques for detecting a short circuit caused by the entry of a liquid such as water onto two pins of an external connector of a portable device. Other embodiments are also described.

BACKGROUND

Electronic devices and in particular portable consumer devices such as smartphones and tablet computers are prone to accidental exposure to liquid or moisture that causes a short circuit, especially at their external connectors. A portable device may become wet for example when exposed to rain, when accidentally dropped in water, or having been subjected to its user's sweat in the case of a wearable portable device. Dye-based liquid contact indicators are available that when exposed to moisture show a visible mark, and these indicators have been installed within the portable device and are visible from the outside of the device. This allows a technician to easily inspect the status of the indicator to determine whether or not the device has been exposed to liquid. Alternatively, or in addition, a liquid contact sensing circuit may be provided within the device that makes measurements across designated, internal electrodes, such as resistance and capacitance measurements, in order to detect the presence of liquid on those electrodes. Corrective actions may be taken in real time, in response to liquid detection, for example by powering down certain sensitive electronic components in the device. With respect to the external ports or connectors, the power being supplied to a port may be reduced or even terminated, such that the voltage across the electrical contacts of a port of the device is reduced or dropped to zero, in response to having detected the presence of short-circuit causing moisture adjacent to the port or within the port.

SUMMARY

There is a need for a reliable approach to detect the presence of a short circuit-causing liquid (e.g. sweat, pool water, sea water, rain, or a beverage) in an external connector of an electronic device, such as a consumer electronics portable device, and also to mitigate corrosion on the external connector that would be caused by continued presence of the liquid on powered pins of the connector. A method in an electronic system for protecting an external connector of the system from corrosion includes the following operations. The connector has at least first and second pins. For example, the first and second pins may be adjacent neighbors within the external connector, e.g. there are no other connector pins in between them. The first pin is un-driven except for being pulled to ground through a predetermined first resistance, also referred to here as a short-detection resistance. The second pin may be a data or control pin on which there is a significant enough AC or DC voltage, or it may be a power supply rail of the system that conducts electrical power into or out of the device and that has a DC power supply voltage that is at a nominal level. While the system is powered on, for example during normal operation, the voltage of the first pin is compared to a predetermined threshold, and in response to that threshold being exceeded, a power supply voltage is reduced while the system remains powered on. The latter causes voltage on the second pin to be reduced proportionally, which in turn may reduce the onset of corrosion onto the first and second pins (due to a short circuit across the pins that is caused by a liquid). No separate test stimulus is needed to be applied to any of the two pins. Power transfer and communications (e.g. audio signal transfer, control signaling) may still continue through the external connector albeit at reduced performance levels (due to the reduced power supply voltage).

In one embodiment, the system is a consumer electronics portable device that has a context awareness module which produces information on context awareness of the portable device. The decision to test for a short circuit (make the measurement of the voltage of the first pin and compare to a threshold) is done in response to such information that may indicate what type of accessory is plugged into the external connector, the location of the portable device based on a GPS receiver output or a wireless local area network connection, or the physical activity of a user of the portable device based on output from an inertial sensor in the portable device. In other words, the process of checking for liquid intrusion and corrosion mitigation is not triggered until the context awareness justifies it.

In one embodiment, the measurement and detection occurs in a relatively short time window and may be repeated (for example periodically). Before measuring the voltage of the first pin, and during normal operation of the system in which the first pin is being used as a communication (data or control) signal path of a component of the system, the signal path is de-coupled from the first pin, and the predetermined first resistance (short detection resistance) is switched in as a pull down to ground. This may be at the start of the measurement window. This ensures that the first pin is unused during the measurement (except for being pulled to ground through the predetermined first resistance). If at that point the voltage of the first pin does not exceed a predetermined voltage threshold (no short circuit is detected), then the signal path from a component of the system is re-coupled to the first pin so that communications may resume through that pin of the connector. This may end the measurement window.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the relative positions or order and other aspects of the parts described in the embodiments are not explicitly defined, the scope of the invention is not limited to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
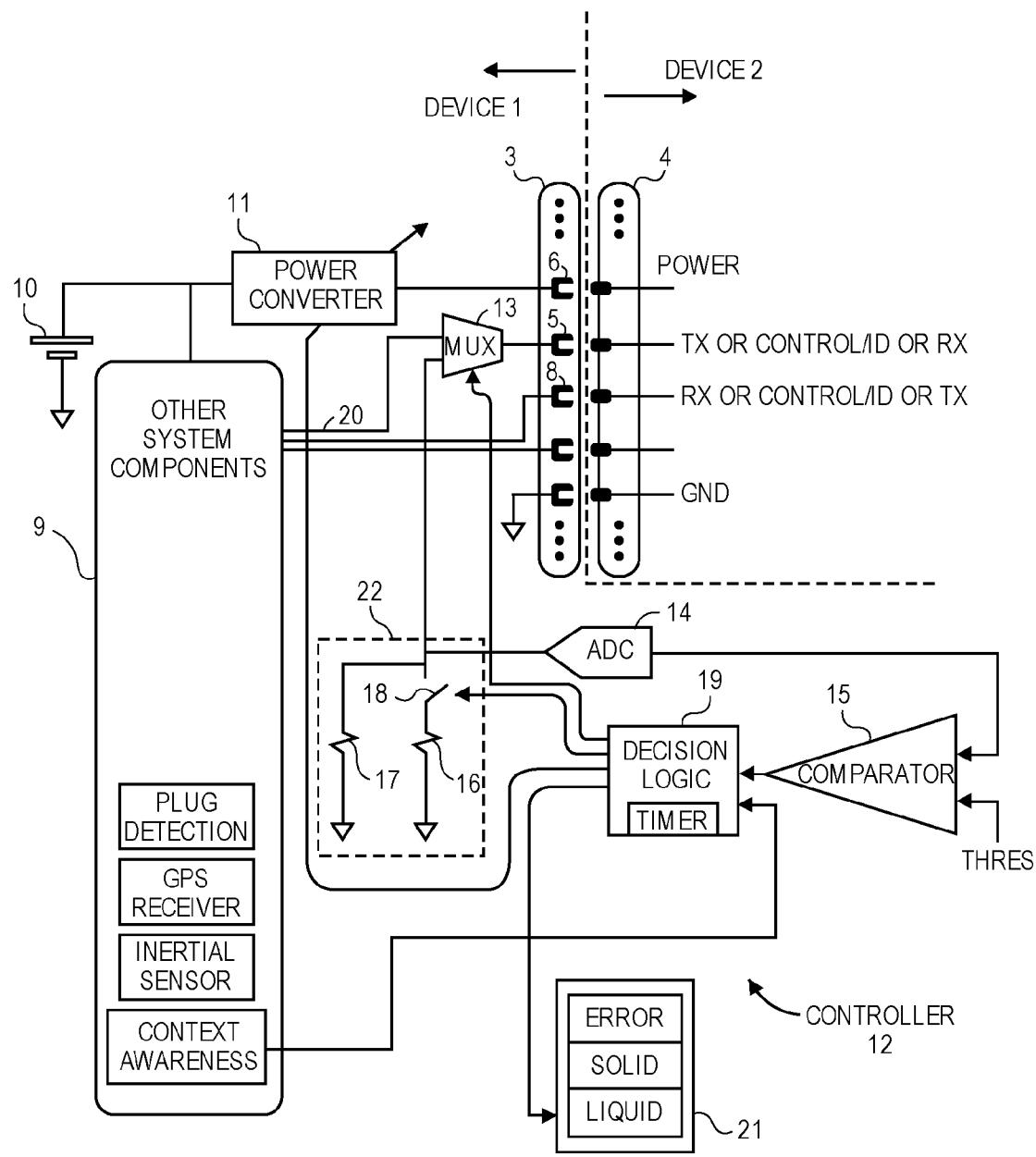
FIG. 1 is a combined block diagram and circuit schematic of part of an electronic system in which liquid intrusion detection and corrosion mitigation are implemented in accordance with an embodiment of the invention.
Figure 6A:
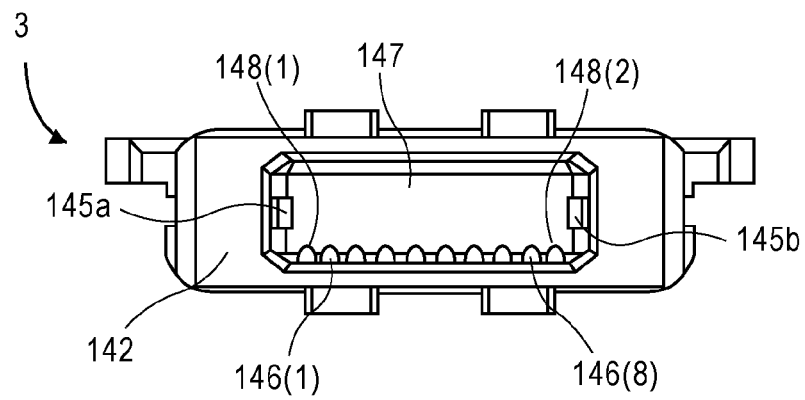
FIG. 6a depicts an example of the external connector.

FIG. 1 is a combined block diagram and circuit schematic of an electronic system in which a controller 12 is provided to detect liquid intrusion through an external connector 3 (e.g., a receptacle connector as depicted in FIG. 6a), and also to take a preventative action that mitigates corrosion in the connector 3. In this example, the system is a consumer electronics portable device 1, such as a smartphone, a mobile or cellular phone, a tablet computer, a laptop computer, or a wearable such as a wristwatch or a headset, whose housing has the external connector 3 built-in but exposed to the outside (and hence liquid intrusion). The external connector 3 may be a computer peripheral serial bus connector such as a Universal Serial Bus compliant connector or other electrical connector that serves to both pass a power supply voltage as well as a digital or analog control or communications signal (e.g. an audio signal, a control signal) to an external device 2 (e.g. an accessory such as a headset). The connector 3 may have a receptacle (not shown in FIG. 1, but see the example in FIG. 6a) in which multiple pins or contacts, e.g. communication or control signal pins, e.g. a transmit (Tx), receive (Rx), or control/identification (ID) pin, a common return or ground pin, and a power supply pin, may be exposed. The latter pin is used as a power supply rail of the potable device 1 and may also be used by an external device 2 that is connected to the portable device 1 via its mating connector 4, e.g. see FIG. 6b which shows an example mating connector 4 that can be "plugged into" the receptacle connector shown in FIG. 6a. Of course, the concepts described here are not limited to such example connectors, of which a first pin 5, and either a second pin 6 or a third pin 8 are being used to detect liquid intrusion. In one embodiment, the techniques here are applicable to any connector having three or more pins of which at least one serves as a power supply rail and another serves as a control or communications signal path. See FIG. 6a as an example in which the external connector 3 has eight pins or contacts.

The portable device 1 has a power converter 11 (e.g. a DC-DC step up voltage regulator) that produces the power supply voltage on the second pin 6 of the connector 3 relative to a ground pin (gnd). The third pin 8 maybe a data or control (communications signaling) pin on which a significant DC or AC voltage appears during normal operation of the portable device 1, which voltage may be limited to that of the power supply voltage on the second pin 6. In one embodiment, the second pin 6 has the highest voltage of all of the pins of the connector 3. The power converter 11 produces a variable output, regulated DC or AC voltage that may range from a nominal level down to zero volts (ground), and which is controllable as commanded by decision logic 19 which is part of the controller 12. The other system components 9 may include a variety of different components, depending on the particular type of portable device 1, which in most instances would include a touchscreen, a wireless local area network controller, a global positioning system (GPS) receiver, one or more inertial sensors (e.g. an accelerometer, a gyro), an audio capture and playback subsystem (not shown) and a variety of higher layer software components that are to run on a main system processor (not shown), such as an email application, a web browser, a calendar program, and other desirable applications. Also included as part of the system components 9 may be a plug detection module which is a software component that in conjunction with certain hardware provides an indication or flag when the mating connector 4 is joined to (e.g. plugged with) the external connector 3. The plug detection module may also indicate the type of the external device 2, e.g. an accessory such as a wired headset, or a power adapter for charging a battery 10. In some situations where a conventional plug detection procedure is unreliable due to the presence of liquid in the connector 3, the plug detection module can attempt to perform simple communications through the pins 5, 8 of the external connector 3 in order to determine whether or not the mating connector 4 is plugged in.

The other system components 9 depicted in FIG. 1 may also include a context awareness module which is a software program that collects various data (including output from the inertial sensor) within the portable device 1 and analyzes the collected data to form various conclusions on context awareness (which term, as used here, also includes location awareness). The context awareness may include context types such as the location of the device 1, the identity and role of the user, the activity in which the user is engaged and the time of day. This being a portable device, a battery 10 is also provided within the housing of the device 1 to supply power to operate the other system components 9 as well as to the power converter 11, and also to the elements of a controller 12 that is described further below.

A multiplexer 13 which is an analog multiplexer has an output that is coupled to the first pin 5 of the connector 3, a first input that is coupled to a control or communications signal path 20 of a component in the system (which is part of a group of other system components 9), and a second input that is coupled to an input of an analog to digital converter (ADC) 14. The second input of the multiplexer 13 (or the input of the ADC 14) is also coupled to a resistor switch circuit 22 that acts as a variable resistance pull-down to ground, as shown. The resistor switch circuit 22 is selectively controllable through a switch 18, where the switch 18 is controllable to alternately close and open so as to pull to ground the input of the ADC 14 through either a first resistance R1 or a second resistance R2, where R2>R1. In the example of FIG. 1, this is achieved through the use of two discrete resistors 16, 17 that are coupled to ground at one end and to the input of the ADC 14 at another end, with the resistor 16 being switched in or out by virtue of the switch 18 being coupled in series therewith. In one configuration, when the switch 18 is closed, the pull down on the input of the ADC 14 is a predetermined, first resistance, also referred to as the short-detection resistance R1 which is given by the parallel connection of the two discrete resistors 16, 17—see FIG. 2a. In another configuration, shown in FIG. 2b, the pull down is through a predetermined, second resistance, also referred to as the leakage-detection resistance R2 which is given by the resistor 17 by itself. As explained further below, R2>R1 and R2 is used as the pull down when the decision logic 19 is evaluating leakage at the input of the ADC 14, while the smaller resistance R1 is used as the pull down when the decision logic 19 is detecting a short circuit across the pins 5, 6 (or across the pins 5, 8) of the external connector 3. In both cases, a voltage across the resistor switch circuit 22 is measured by the ADC 14, as explained below.

A number of components that form part of the controller 12 as shown include decision logic 19, comparator 15 and data storage location 21. The controller 12 has an input from the output of the ADC 14, which is an input to the comparator 15. The comparator 15 serves to compare the binary value at the output of the ADC 14 to a predetermined threshold value (thres). The controller 12 has a number of outputs, in this case four are shown, one of which is coupled to a control input of the power converter 11, another is coupled to the control input of the multiplexor 13, while another is coupled to a control input of the switch 18. A fourth output is shown as being coupled to access the data storage location 21.

Note here that, as also pointed out above, although FIG. 1 shows several components that may be found in a particularly complex embodiment of the portable device 1, the same figure is also used to illustrate other less complex embodiments in which some of the components shown in FIG. 1 may be omitted (in the interest of conciseness and reducing the total number of figures). For example, while the external connector 3 and its mating connector 4 are shown as having more than five pins, the concepts described here may also be applicable to an external connector 3 having only three pins, namely a power pin, a combined Tx and Rx pin (a serial communications line that is bidirectional), and a power supply return or ground (gnd) pin. Also, the arrangement shown in FIG. 1 in which the multiplexor 13 is signaled (through its control input) to selectively route or not route the signal path 20 (of one of the other system components 9) to the first pin 5, may be replicated on other pins of the external connector 3, to also perform the short circuit detection process on other pins (using the same switch circuit 22).

Figure 2A:
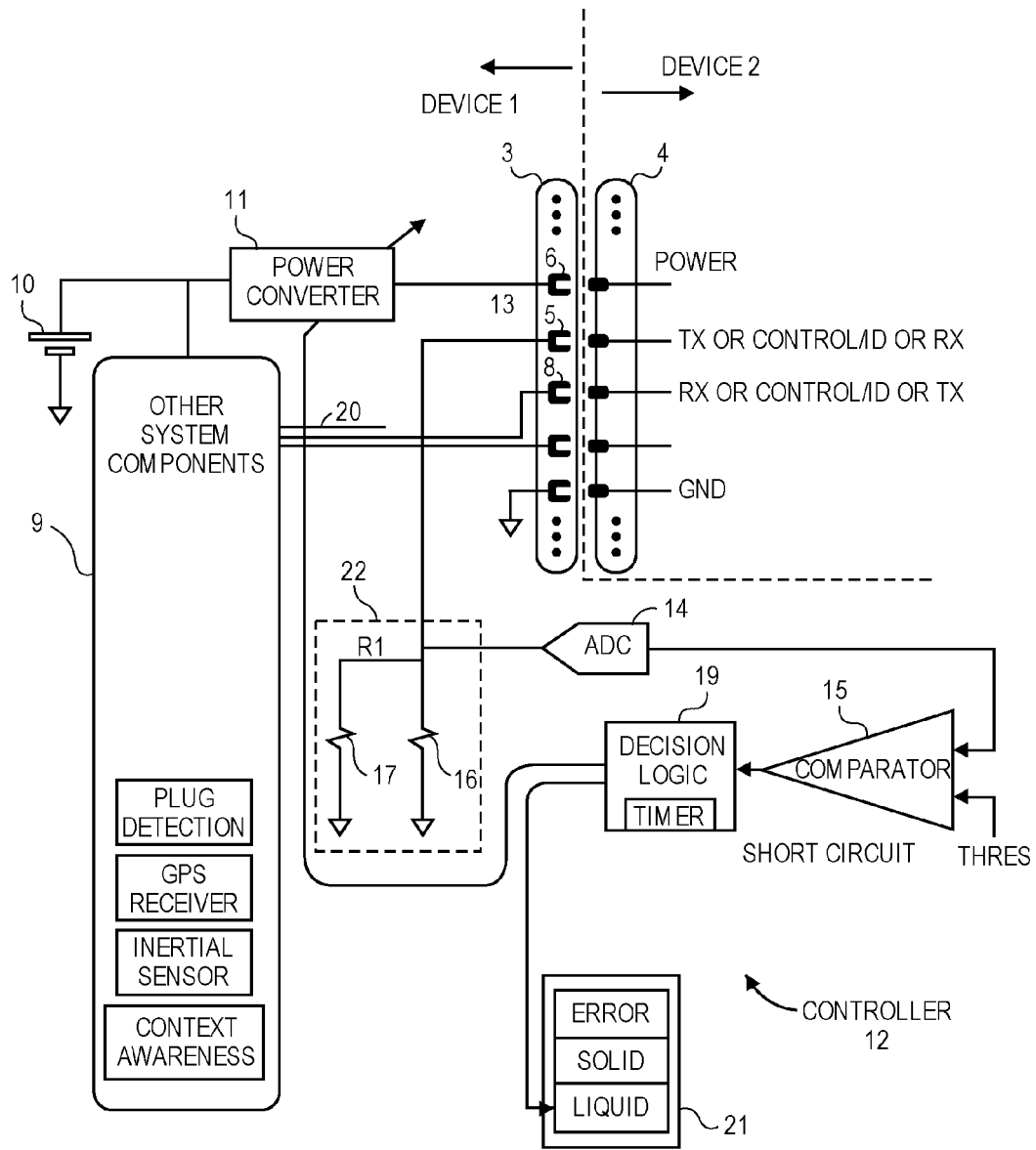
FIG. 2a shows the configuration of the multiplexer and resistor switch circuitry in FIG. 1 during short-detection measurement.

In one embodiment, the controller 12 is to perform the following operations, by its decision logic 19 and by the comparator 15. Note that the latter two elements may be implemented as a programmed processor, e.g. as one of the processors available in the other system components 9, including a processor that is part of a power management unit, another auxiliary processor, or even the main system processor of the device 1. The decision logic 19 signals the multiplexer 13 to route the first pin 5 of the connector 3 to the input of the ADC 14 (which results in decoupling the signal path 20 from the first pin 5), while simultaneously signaling the switch 18 to remain closed so that the first pin 5 of the connector 3 is un-driven (it is de-coupled from the signal path 20) except for being pulled to ground through the first resistance R1. FIG. 2a shows this configuration of the resistor switch circuit 22 and the multiplexer 13. The controller 12 in that state proceeds with comparing the measured voltage of the first pin 5 to the predetermined threshold (thres), and specifically by action of the comparator 15. Note that the latter may be a programmed processor comparing two binary or digital values, e.g. as a subtraction or as a ratio. In response to the output of the ADC 14 exceeding the predetermined threshold (which in this state is referred to as a short circuit threshold), the decision logic 19 signals the power converter 11 to reduce the power supply voltage that it produces on the second pin 6 of the connector 3, while the device 1 remains powered-on. In this situation, the result of the comparison suggests that a liquid intrusion has been detected that forms a short circuit bridging the first pin 5 and the second pin 6, or the first pin 5 and the third pin 8 (assuming the latter has a significant enough voltage on it), which causes the voltage on the pin 5 to rise above the short circuit threshold. The power converter 11 reducing the power supply voltage on the second pin 6 helps reduce or mitigate the buildup of corrosion on the pins 5, 6, 8 of the connector 3 (that would be caused by the liquid).

To achieve accurate detection of the short circuit, various experiments may be conducted in the laboratory to evaluate the short circuit impedance that is created by a liquid that bridges the pins 5, 6 or the pins 5, 8 of the external connector 3. Such an impedance forms a resistor ladder with the first resistance R1, and the latter is chosen so that a suitable voltage is developed (during a short circuit) for the ADC 14 to digitize. The value of R1, or the strength of the pull down created by the parallel connection of the resistors 16, 17, may be specific to the particular system (portable device 1). It is a function of the input impedance of the ADC 14, as well as the expected range of the short circuit impedance (that is caused by the presence of liquid that bridges the first and second pins 5, 6 or the first and third pins 5, 8). The latter may be dictated by how much liquid can be present within the physical space of the external connector 3 that surrounds the pins 5, 6 (or the pins 5, 8) as well as the geometry of the pins 5, 6, 8 and the housing of the external connector 3, e.g. the nearby support walls of a receptacle of the connector 3. In addition, the choice of the resistance R1 also depends on the expected voltage level that is on the neighbor pin, in one example the second pin 6 which is to receive a power supply voltage, and also the input voltage range of the ADC 14. For example, if the power supply voltage on the pin 6 is 20 Volts, the input range of the ADC 14 is 1 Volt, and the expected short circuit impedance is on the order of 1 k Ohms, then R1 may be chosen to be in the range of 100 k Ohms (to work as a proper pull down resistance). If however the expected short circuit produced by liquid intrusion is on the order of 10 k Ohms-100 k Ohms then R1 may need to be increased to the 200 k Ohms range (in order to produce a reasonable level at the input of the ADC 14). Note here that the first resistance R1 may for example be at least one hundred times greater than the resistance of an electrical termination that is typically specified for any communications bus. For example, in one embodiment, R1 is in the range of 75 k Ohms-250 k Ohms. As such, the resistance R1 may be described as a "weak" pull down resistance, e.g. not strong enough to reliably ensure a "logic zero" level on a digital communications signaling line.

Figure 2B:
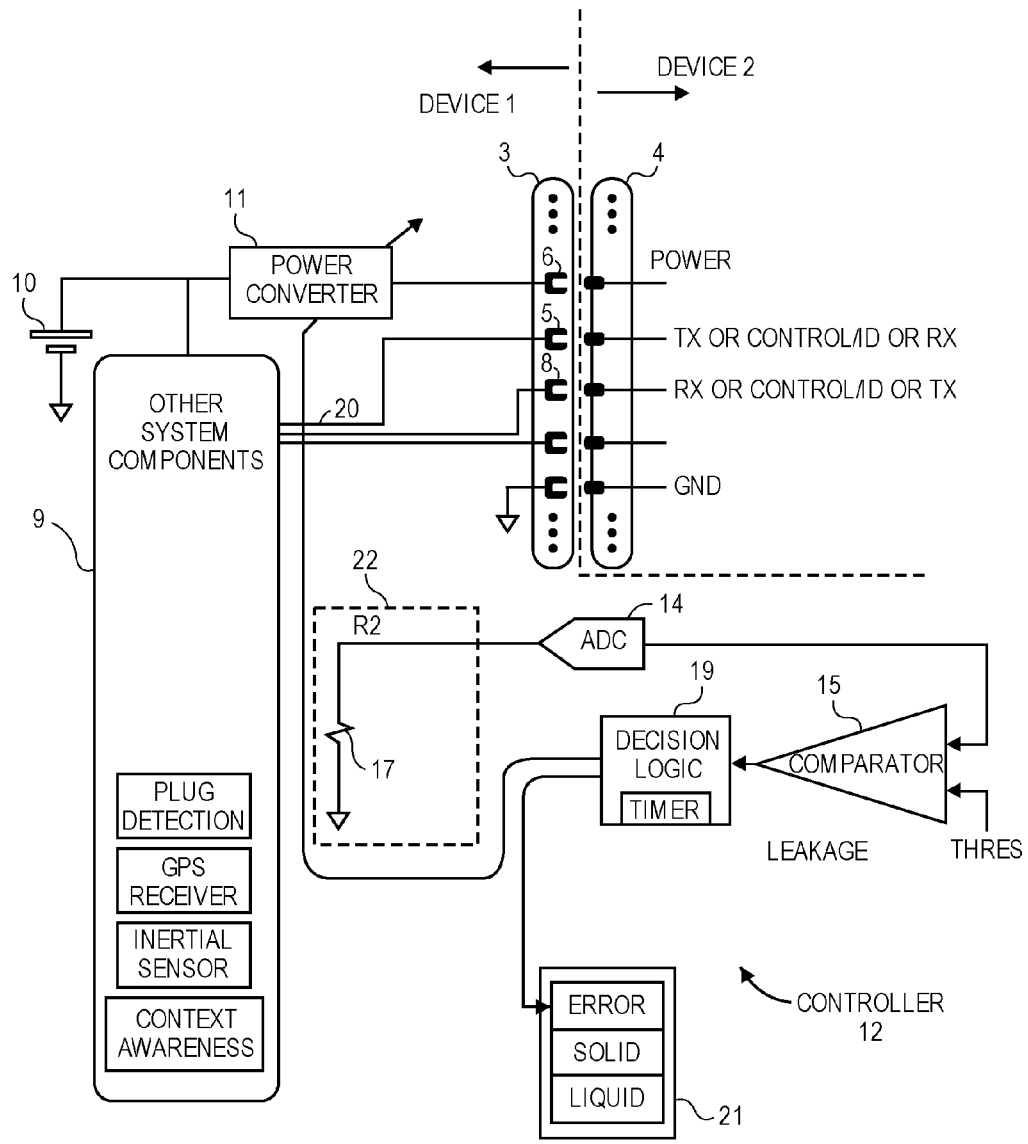
FIG. 2b shows the configuration of the multiplexer and resistor switch circuitry in FIG. 1 during leakage-detection measurement.

To help ensure greater reliability or accuracy of the liquid intrusion detection being performed by the ADC 14 and the comparator 15, a leakage detection process is also performed by the controller 12, as follows. For this purpose, the resistor switch circuit 22 is configured to pull the input of the ADC 14 to ground through a predetermined, second resistance R2 that is greater than the short detection resistance R1. In the example of FIG. 1, this may be achieved by switching out the resistor 16 (by opening the switch 18) thereby leaving in place the resistor 17 which by itself may have a resistance R2 that is, for example, at least ten times greater than R1, such as in the range of 1M Ohms-5M Ohms. The value of R2 depends on the expected leakage current that is on the input node of the ADC 14, where this may depend on the input impedance of the ADC 14 as well as the input impedance of the second input of the multiplexer 13 when that input has been de-coupled from the output of the multiplexer 13. With the circuit configured in such a manner as shown in FIG. 2b, which is a result of the controller 12 signaling the resistor switch circuit 22 to open and the multiplexer 13 to de-couple its second input from its output, the input of the ADC 14 is un-driven except for being pulled to ground through the predetermined, second resistance R2. At that point, the output voltage of the ADC 14 is compared (using the comparator 15) to a predetermined leakage threshold. In response to the ADC input voltage exceeding the leakage threshold, the controller 12 asserts a detection error flag within the data storage location 21. Where the error flag has been set, this suggests that any decision that was made by the controller 12 in the configuration of FIG. 2a regarding detection of a short circuit may be erroneous, due to there being too much leakage current at the input node of the ADC 14. Excessive leakage current at the input of the ADC 14 in the configuration of FIG. 2a will cause a large enough voltage across the first resistance R1 even though there is no liquid intrusion (no short circuit across pins 5, 6) which is interpreted erroneously by the decision logic 19 as being due to a liquid or solid contaminant on the pins 5, 6.

Still referring to FIG. 1, in one embodiment, the decision logic 19 signals the power converter 11 to maintain the power supply voltage on the second pin 6 at a reduced but non-zero level, so long as the voltage of the first pin 5 (being compared by the comparator 15 while in the configuration of FIG. 2a) exceeds the predetermined short circuit threshold, and the system continues to be powered-on. In that case, performance by the portable device 1 of any actions that relate to the external connector 3, including providing power to the external device 2 and communicating with the external device 2, may continue albeit at a lower performance level. The expectation here is that the detected short circuit condition across the pins 5, 6 (or the pins 5, 8) of the external connector 3 may be "temporary."

The decision logic 19 has a drying window timer that may have been previously programed to represent a certain period of time at the end of which any liquid contaminant in the connector 3 would likely have dried, such that the resulting short circuit would have dissipated. The timer is started by the decision logic 19 in response to the voltage of the first pin 5 exceeding the short circuit threshold. The comparator 15 and the decision logic 19 then continue to "monitor" the voltage of the first pin 5 until expiration of the timer. If at that point the voltage of the first pin 5 still exceeds the predetermined threshold, then a decision can be made that the short circuit condition is likely caused by solid contamination rather than a liquid contaminant, so that a solid contamination detected event ("solid") is logged within the data storage location 21. The expectation here is that with liquid intrusion, the short circuit condition that has been detected should dissipate as the liquid dries, over a certain period of time that may be determined for example during laboratory testing (and then programmed into the timer for in-the-field use).

The controller 12 is also able to confirm whether or not the detected short circuit condition can be attributed to liquid contamination. For that, the decision logic 19, upon determining that the voltage of the first pin 5 exceeds the predetermined short circuit threshold, starts the drying window timer. If upon expiration of the timer, the voltage of the first pin 5 is now less than the short circuit threshold, then the expectation is that any liquid intrusion has likely evaporated, such that a liquid contamination detected event ("Liquid") is logged within the data storage location 21.

Still referring to FIG. 1, in yet another embodiment, the decision logic 19 may have another basis to log the liquid contamination detected event (within the data storage location 21). The decision logic 19 may start monitoring the output data of an inertial sensor (part of the other system components 9) in the device 1, in response to determining that the voltage of the first pin 5 exceeds the short circuit threshold (see FIG. 2a). While the monitored output data of the inertial sensor exceeds an activity threshold, and if the voltage of the first pin 5 falls below the short circuit threshold, then a decision may be made to log the liquid contamination detected event. In other words, in this case, the decision logic 19 waits before logging the liquid contamination detected event, until the voltage on the first pin 5 drops to below the predetermined threshold while the inertial sensor output data shows a minimum level of activity (or movement) by the device 1. This is based on the assumption that if the detected short was caused by liquid intrusion, then in many instances the liquid may spread due to movement of the device 1, so as to reduce the severity of the short circuit across the pins 5, 6. In contrast, if the short circuit were caused by a solid contaminant, then it would be less likely that movement of the device 1 (above a certain level, as detected using the output data of the inertial sensor) could dislodge the solid contaminant. Accordingly, while the controller 12 is monitoring the output data of the inertial sensor and while the output data exceeds an activity threshold, if the decision logic 19 finds that the voltage of the first pin 5 continues to remain above the short circuit threshold, then at that point the decision logic 19 may log a solid contamination detected event (within the data storage location 21).

In one embodiment, the portable device 1 has a context awareness module (see FIG. 1) that provides its context awareness information to the controller 12. The controller 12 and in particular its decision logic 19 may make its decisions in signaling the multiplexer 13, the resistor switch circuit 22, and when evaluating the results of the comparator 15, in response to or based on the information on context awareness indicating one of the following situations: a type of accessory that is plugged into the external connector (e.g. wired headset); the location of the device 1 based on the output from the GPS receiver or from a wireless local area network connection; or physical activity of a user of the device 1 based on output from the inertial sensor. In this manner, the process of protecting the external connector 3 from corrosion, based on the detection of liquid intrusion in the connector 3, need not be performed at all times, but rather only when liquid intrusion is expected (thereby making efficient use of the limited energy available in the battery 10). As examples, when the information on context awareness indicates that the user of the device 1 is at a work out gym or is jogging, the detection process should be started to protect the external connector.

Figure 3A:
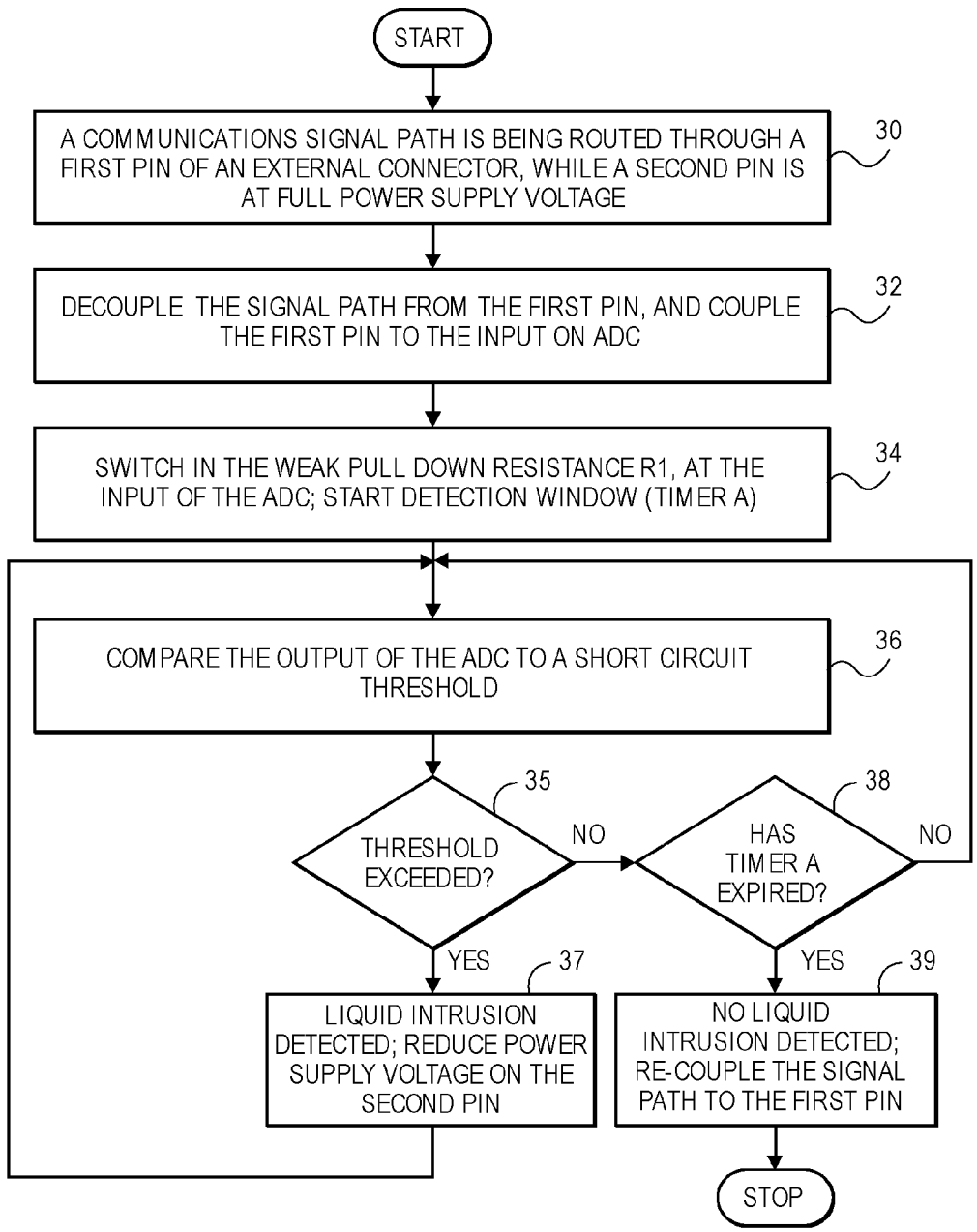
FIG. 3a is a flow diagram of a process for liquid intrusion detection and corrosion mitigation, in accordance with an embodiment of the invention.

The following methods may be performed in an electronic system, such as the portable consumer electronics device 1 of FIG. 1, for protecting an external connector of the system from corrosion. These operations may be performed by the controller 12 described above, for example as a processor that has been programmed in accordance with instructions stored in a memory (part of the other system components 9, for example). Referring to the flow diagram of FIG. 3a, the signal path 20, which is a communications or control signal path of one of the other system components 9, is being routed through the first pin 5 in operation 30, e.g. during normal operation of the system. The signal path is then de-coupled from the first pin 5 in operation 32 (e.g. by signaling the multiplexer 13 to couple its output to one of its inputs that is coupled to the input of the ADC 14). In addition, in operation 34, the first resistance R1 is switched in, to the input of the ADC 14 (e.g. by signaling the switch 18 to close, resulting in the configuration of FIG. 2a).

Operation then proceeds with measuring the voltage of the first pin 5 (at the output of the ADC 14). Note how this measurement occurs while the first pin 5 is un-driven (it is de-coupled from the signal path 20) except for being pulled to ground through the resistor switch circuit 22 configured into resistance R1, and also while the second pin 6 is a power supply rail on which a power supply voltage is present. In operation 36, the measured voltage is compared to a short-circuit threshold (see FIG. 2a) and if the threshold is exceeded (operation 35) then the power supply voltage on the second pin 6 is reduced in operation 37 (while the system continues to remain powered on). In other words, the power supply voltage on the second pin 6 is reduced to a non-zero level, which may or may not allow the connector 3 to continue to be used for its intended or normal purpose of transferring power and communication signals to an external device.

In one embodiment, when measuring the voltage of the first pin 5, a timer A is started, e.g. in operation 34. Upon expiration of the timer A (operation 38) if the voltage of the first pin 5 continues to remain less than the short circuit threshold, then a decision can be made that no liquid intrusion has been detected during this time window (operation 39). As a result, the signal path 20 can be re-coupled to the first pin 5 (e.g. by signaling the multiplexer 13 to couple its output to the signal path 20, instead of to the input of the ADC 14 and the resistor switch circuit 22).

The following operations may be performed to improve the reliability of the decision made as to whether a liquid or solid contaminant has been detected in the connector 3. Either before or after the operations that are a part of the short circuit detection process of FIG. 3a, a leakage detection process may proceed as follows. The input of the ADC 14 which is used to measure the voltage on the first pin 5 during the short circuit detection process, is decoupled from the first pin 5, and the first resistance R1 is switched out as a pull down to ground on the input of the ADC 14. This may be done by signaling the multiplexer 13 to decouple its second input from its output, and by signaling the switch 18 to open, so that the input of the ADC is un-driven except for being pulled to ground through a resistor 17. As a result, the input of the ADC 14 is now un-driven except for being pulled to ground through a second resistance R2 that is larger than the first resistance R1—see FIG. 2b. As an example, R2 may be at least ten times greater than R1, such that R2 may be for example in the range of 1M Ohms-5M Ohms. This is consistent with the expectation that any leakage current on the input of the ADC 14 may be at least ten times smaller than the current that results from the presence of liquid intrusion on the pins 5, 6. With the system configured as in FIG. 2b, the voltage of the input of the ADC 14 is measured (by the ADC 14 itself), and compared to a leakage threshold, where if the leakage threshold is exceeded, then a detection error flag is asserted within the data storage location 21 in the system. This is an indication that any decision that is based on the short circuit threshold being exceeded in FIG. 3a (as made by the decision logic 19) is likely incorrect, due to too much leakage current causing a voltage drop across the smaller resistance R1 (in the configuration of FIG. 2a), in the absence of any short circuit across the pins 5, 6.

Figure 3B:
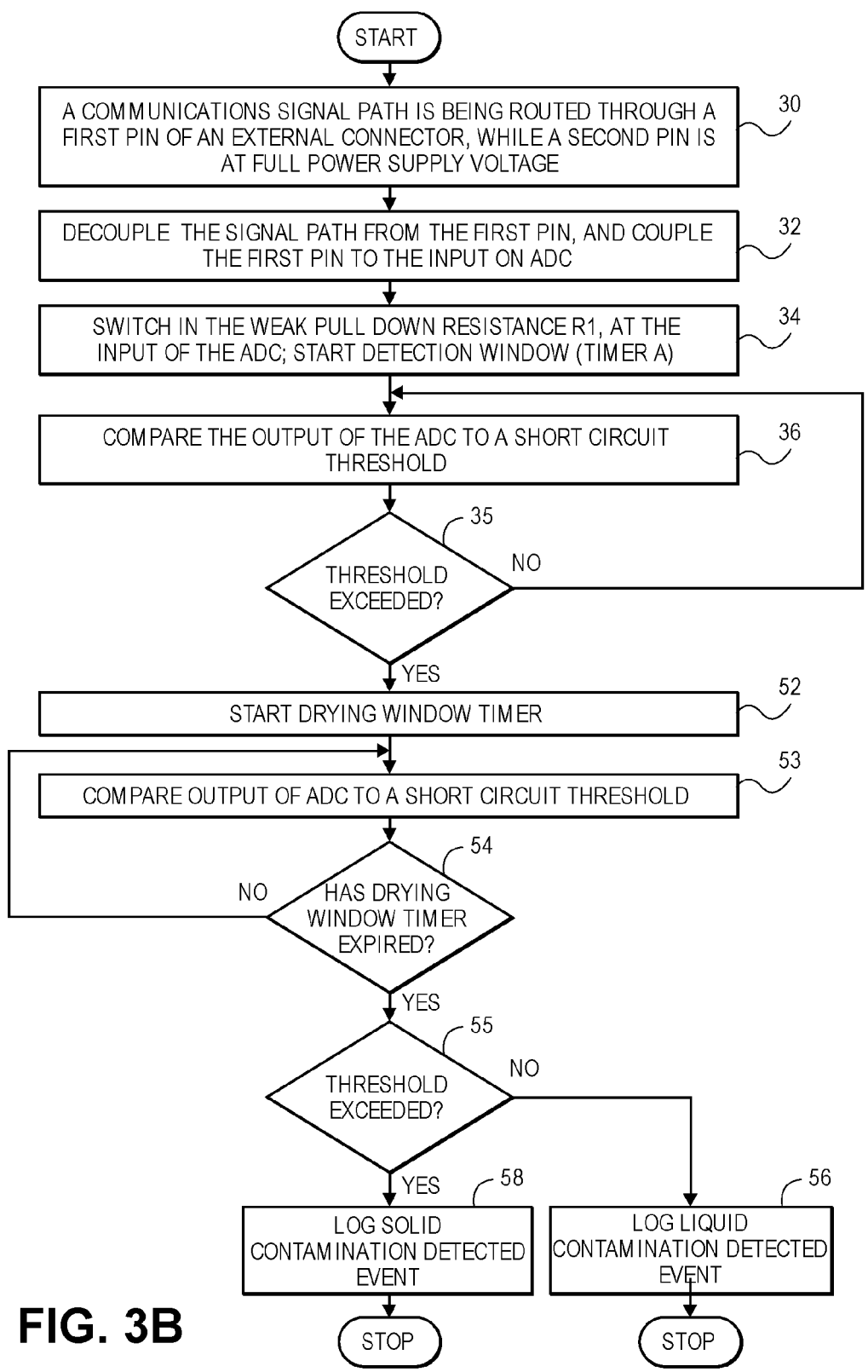
FIG. 3b is a flow diagram of a process for logging liquid and solid contamination detection events.

In another embodiment, referring to FIG. 3b, the liquid contamination detected event ("Liquid") is logged within the data storage location 21 as follows. The process begins with operations 30-36, which may be the same as in FIG. 3a described above. Next, in response to the voltage of the first pin 5 exceeding a first short circuit threshold (operation 35, and the configuration in FIG. 2a), a drying window timer is started (operation 52). The output of the ADC is monitored (operation 53). Upon expiration of the drying window timer (operation 54), if the voltage of the first pin 5 has dropped below a second threshold (operation 55) then this corresponds to the situation where a liquid contaminant has dried out (within the time interval defined by the drying window timer) such that a liquid contamination detected event is logged (operation 56). If, however, upon expiration of the drying window timer, the voltage of the first pin 5 exceeds the second short circuit threshold, then a solid contamination detected event is logged (operation 58). That is because the time interval defined by the drying window timer is long enough for any liquid contaminant to evaporate, whereas a solid contaminant would remain stuck within the connector thereby maintaining the short circuit condition beyond expiration of the timer.

In another embodiment, the liquid contamination detected event is logged based on physical activity of a user of the device 1. An inertial sensor of the device 1 is monitored, when the voltage of the first pin 5 exceeds the first short circuit threshold. While the output data of the inertial sensor is being monitored and is found to exceed an activity threshold, if the voltage of the first pin 5 then drops to below a second short circuit threshold, the liquid contamination detected event is logged. This reflects the situation where a certain amount of movement of the portable consumer electronics device 1 is expected to sufficiently spread out the liquid contaminant. In contrast, if the output data of the inertial sensor exceeds the activity threshold but the measured voltage of the first pin continues to exceed the second short circuit threshold (despite movement of the device) then a solid contamination detected event is logged. This reflects the finding that shaking or other movement of the portable device 1 may not be successful in dislodging a solid contaminant from the connector. Note here that the second threshold may be the "same" as the first threshold, where this is understood as encompassing some hysteresis in which the second threshold is actually smaller or lower than the first threshold.

In the above-described processes, any comparison made with respect to a threshold should be understood as encompassing comparisons made with respect to a range of which the threshold is an upper or lower bound. For example, the first short circuit threshold may be a lower bound of a liquid contamination short circuit range, such that when the measured voltage falls within the range, a liquid contamination detected event is logged, but when it lies above the range, a solid contamination detected event is logged instead.

Figure 4:
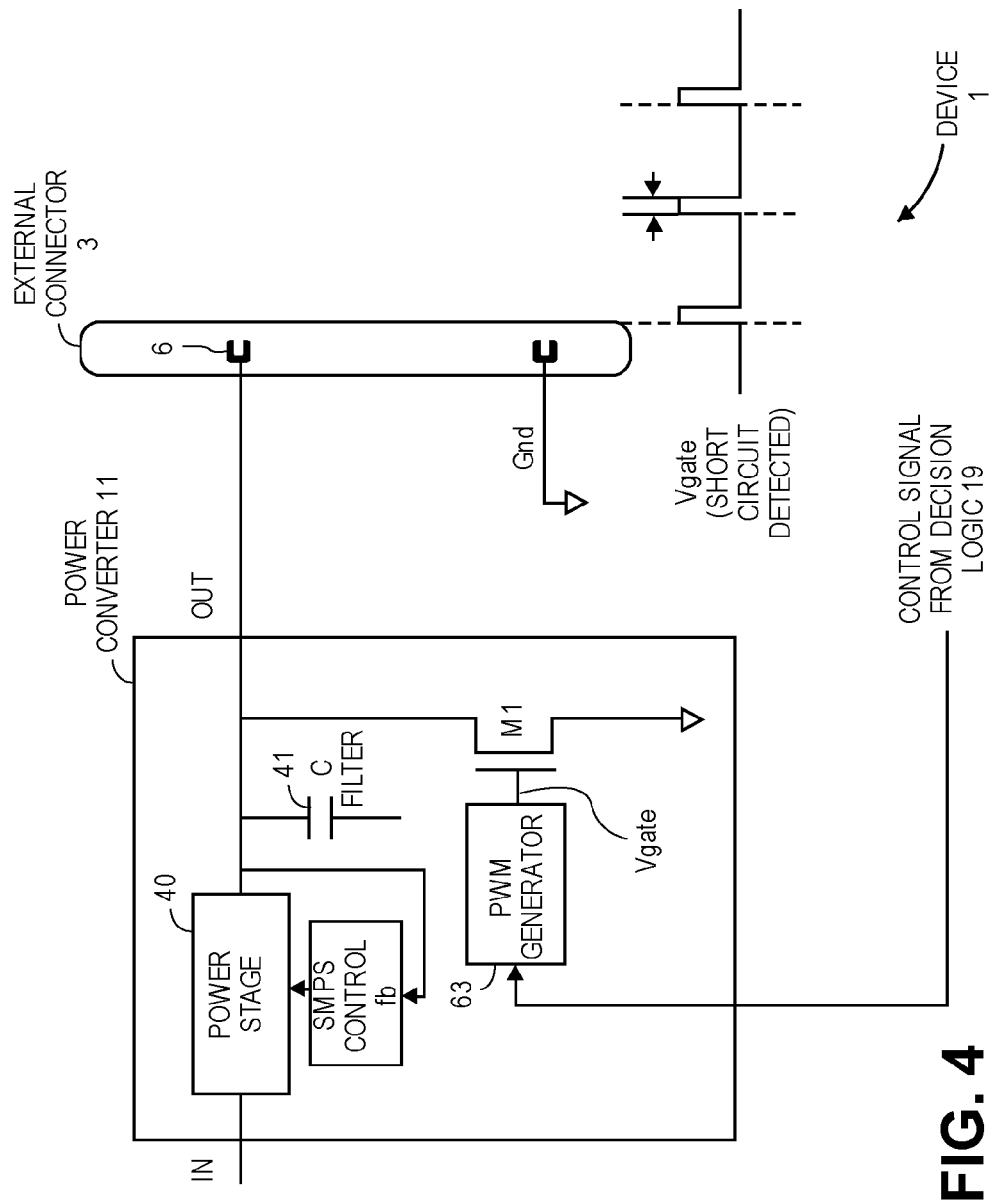
FIG. 4 illustrates a combined block diagram and circuit schematic of an embodiment of a power converter.

The power converter 11 was described above as having the ability to vary its output voltage (based on a signal received at its control input from the decision logic 19), so as to reduce the voltage or power level through the external connector 3, when liquid intrusion has been detected. FIG. 4 illustrates a combined block diagram and circuit schematic of an embodiment of such a power converter. In this example, the power converter 11 may contain a power stage 40 such as that of a switch mode power supply (SMPS) topology, e.g. a buck or boost voltage regulator, where the power stage 40 is controlled by any suitable SMPS controller, having a feedback input (fb) that is received from the output of the power converter 11. A filter capacitor 41 couples the output node of the power stage to ground as shown, serving to filter out any ripple that is caused by the switched current paths in the power stage 40. The output node is coupled to the second pin 6 of the external connector 3, thereby delivering the needed power supply to drive for example an accessory device that may be plugged into the external connector 3. The power converter 11 also has a switch M1 represented in this example by a single field effect transistor that shunts to ground the output of the power stage 40, under control of a pulse width modulation (PWM) generator 63. The switch M1 has a control electrode that receives a control signal Vgate that is produced by the PWM generator 63. Thus, the switch M1 is controlled between its fully on and fully off states by the PWM generator 63, while the control signal received from the decision logic 19 is input to the PWM generator 63. The control signal from decision logic 19 may be for example a digital value within a defined range that is mapped to a duty cycle range of the signal Vgate, such that when a short circuit has been detected by the decision logic 19, Vgate is pulsed in accordance with a duty cycle (or pulse width, as indicated) that is in proportion to the amount of reduction desired by the decision logic 19 in the output voltage of the power converter 11. As the pulse width of Vgate becomes larger, the amount of energy at the output of the power stage 40 and across the filter capacitor 41 that is shunted to ground increases, thereby reducing the output power and output voltage that is delivered through the external connector 3. Note that although the switch M1 is shown as a single field effect transistor, other more complicated solid state switch circuits may alternatively be used.

Figure 5:
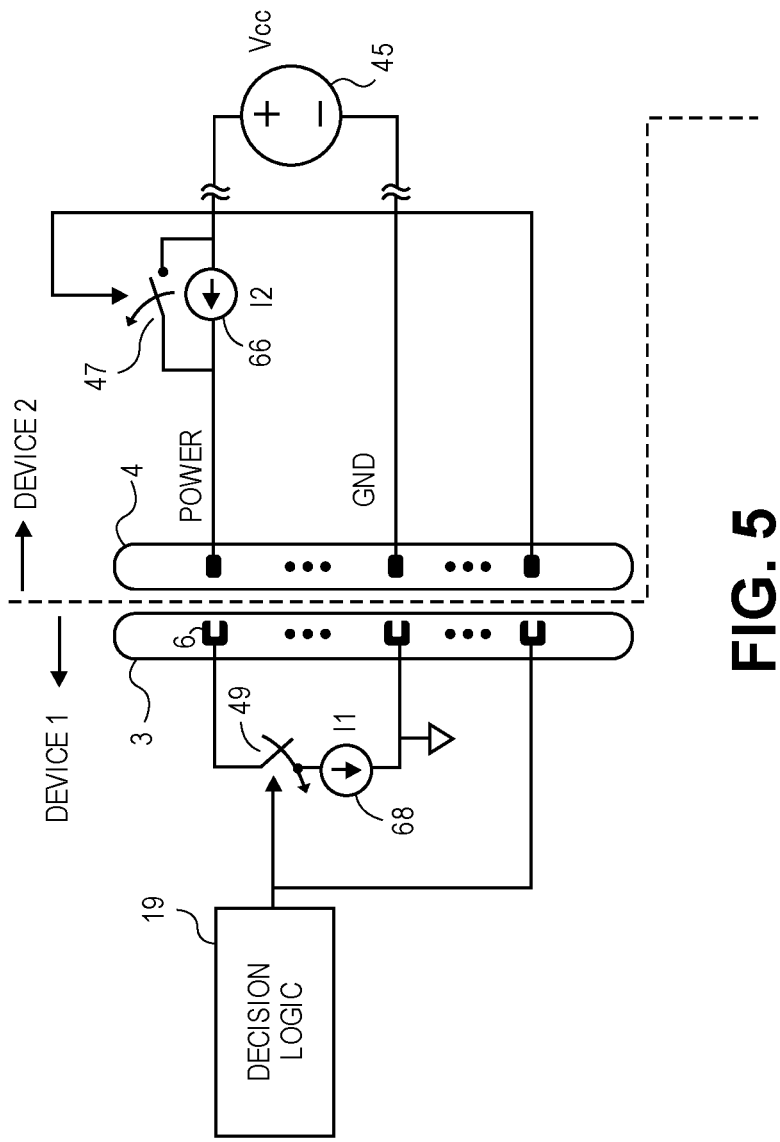
FIG. 5 shows a circuit schematic of another embodiment for protecting an external connector from corrosion.

Turning now to FIG. 5, another embodiment of the invention is shown that takes a different approach to protecting the external connector 3 from corrosion, in the event of liquid intrusion. In this embodiment, the same approach as described above for detecting a short circuit across a pair of pins of the external connector 3 may be used, as in FIGS. 1, 2a, 2b, so that the decision logic 19 has a number of outputs that include those that are coupled to the control input of the multiplexer 13 and the control input of the resistor switch circuit 22 (where those features are not shown in FIG. 5 but are understood as being present, for the sake of conciseness). The decision logic 19 in this case has an output that is coupled to the control inputs of two switches 47, 49. These outputs are "asserted" when liquid intrusion has been detected. Here, the portable communications device 1 has a local, constant current source circuit that is composed of a local constant current source 68 (I1) and a series connected local switch 49, while the remote switch 47 is connected in parallel with a remote constant current source 66 (I2). Thus, in contrast to the embodiment of FIG. 4, the reduction in power or voltage through the pins of the external connector 3 is achieved differently, namely by not causing a reduction in the regulated output voltage of a power converter, but rather by the presence of the two current sources 68, 66 that are connected in series with each other. When liquid intrusion has been detected inside the device 1 (with respect to any two pins of the external connector 3), the decision logic 19 asserts its output signal which closes the local switch 49 and opens the remote switch 47, thereby coupling the current sources 66, 68 in series with each other through the same pin of the connector 3. The current levels I1, I2 may be selected to be equal or they may be a different although they should be small enough so as to reduce the likelihood of corrosion occurring in the external connector 3.

In accordance with FIG. 5, an embodiment of the invention is a consumer electronics portable device comprising a battery; a plurality of system components; an external connector having a plurality of pins including a power supply pin and a power return or ground pin to which an external power source is to be plugged, wherein the external power source comprises a) a power supply circuit that is to produce power which is transferred into the portable device through the power supply pin to charge the battery, and b) a remote, constant current source circuit that can be selectively switched into a series connection between the power supply circuit and the external connector so as to limit the power which is transferred into the device through the external connector; a local, constant current source circuit that can be selectively switched into a series connection between the power supply pin and the power return pin of the external connector so as to limit the power which is drawn into the device through the connector; an analog to digital converter (ADC); a multiplexer having i) an output coupled to a first pin of a plurality of pins of the external connector, ii) a first input coupled to a signal path of one of the plurality of components, and iii) a second input coupled to an input of the ADC; a resistor circuit that is coupled to the input of the ADC and to ground, and that is controllable to selectively pull the input of the ADC to ground through a predetermined, first resistance; and a controller having an input coupled to an output of the ADC, and a plurality of outputs coupled to a) a control input of the local constant current source circuit and to the remote constant current source circuit, a control input of the multiplexer, and a control input of the resistor circuit.

Figure 6B:
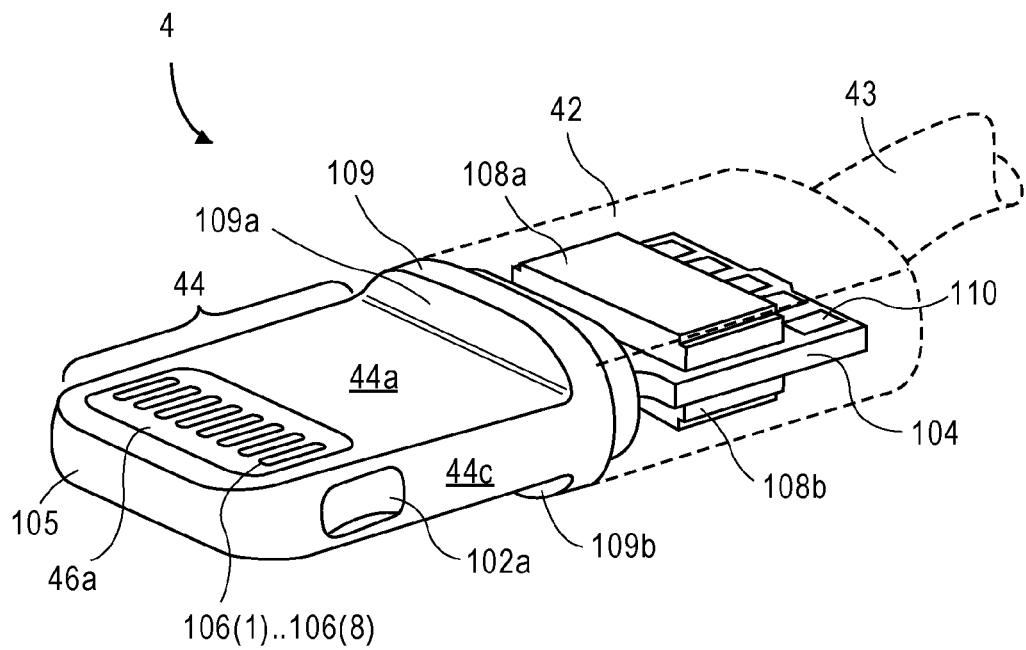
FIG. 6b depicts an example of a mating connector.

FIG. 6a depicts one embodiment of the external connector 3, as a receptacle connector that can be included in the portable device 1, to enable an external device 2 (e.g., an accessory) having the mating connector 4, as depicted in FIG. 6b, to be physically coupled to the portable device 1. The receptacle connector includes eight contacts 146(1) . . . 146(8) that are spaced apart in a single row. The contacts are positioned within a cavity 147 that is defined by a housing 142. The receptacle connector also includes side retention mechanisms 145a, 145b that engage with retention features 102a, 102b in the mating connector 4 (see FIG. 6b) to secure the mating connector 4 within cavity 147 once the connectors are mated. Retention mechanisms 145a, 145b can be, for example springs, and can be made from an electrically conductive material to double as ground contacts. Receptacle connector also includes two contacts 148(1) and 148(2) (sometimes referred to as "connector detect" contacts) that are positioned slightly behind the row of signal contacts and can be used to detect when the mating connector 4 is inserted within cavity 147 and detect when the mating connector 4 exits cavity 147 when the connectors are disengaged from each other.

Reference is now made to FIG. 6b is a simplified perspective view which depicts a dual orientation version of the mating connector 4 having eight external contacts 106(1) . . . 106(8) that are spaced apart along a single row in each of contact regions 46a, 46b. Each contact in contact region 46a is electrically connected to a corresponding contact in contact region 46b on the opposite side of the connector. Contacts 106(1) . . . 106(8) can be used to carry a wide variety of signals including digital signals and analog signals as well as power and ground as previously discussed. In one embodiment, each contact 106(1) . . . 106(8) has an elongated contact surface. In one embodiment the overall width of each contact is less than 1.0 mm at the surface, and in another embodiment the width is between 0.75 mm and 0.25 mm. In one particular embodiment, a length of each contact 106(i) is at least 3 times as long at the surface than its width, and in another embodiment a length of each contact 106(i) is at least 5 times as long at the surface than its width.

The mating connector 4 of FIG. 6b includes a body 42 and a tab portion 44 that extends longitudinally away from body 42 in a direction parallel to the length of the connector. A cable 43 is attached to body 42 at an end opposite of tab portion 44. Tab 44 is sized to be inserted into the corresponding receptacle connector, e.g. as in FIG. 6a, during a mating event and includes a first contact region 46a formed on a first major surface 44a and a second contact region 46b (not shown) formed at a second major surface 44b opposite surface 44a. Surfaces 44a, 44b extend from a distal tip of the tab to a spine 109 that, when tab 44 is inserted into a corresponding receptacle connector, abuts a housing of the receptacle connector or of the portable device 1 in which the receptacle connector is incorporated. Tab 44 also includes first and second opposing side surfaces 44c, 44d that extend between the first and second major surfaces 44a, 44b. In some embodiments, tab 44 is between 5-10 mm wide, between 1-3 mm thick and has an insertion depth (the distance from the tip of tab 44 to spine 109) of between 5-15 mm. Also in some embodiments, tab 44 has a length that is greater than its width which is greater than its thickness. In other embodiments, the length and width of tab 44 are within 0.2 mm of each other. In one particular embodiment, tab 44 is 6.7 mm wide, 1.5 mm thick and has an insertion depth (the distance from the tip of tab 44 to spine 109) of 6.6 mm. In other embodiments, tab 44 has the same 6.7 mm width and 1.5 mm height but a longer length. Such embodiments may be particularly useful for mating with receptacle connectors with an opening in the side of a portable device 1 that has a curved or otherwise highly stylized enclosure.

The structure and shape of tab 44 is defined by a ground ring 105 and can be made from stainless steel or another hard conductive material. Ground ring 105 also includes a flange portion or spine 109 that includes surface 109a and 109b that extend from the spine to the surfaces 44a and 44b, respectively, of the ground ring. The mating connector 4 includes retention features 102a, 102b formed as curved pockets in the sides of ground ring 105 that do not extend to either of upper surface 44a or lower surface 44b. Body 42, which is connected to ground ring 105 at spine 109, is shown in transparent form (via dotted lines) so that certain components inside the body are visible. As shown, within body 42 is a printed circuit board (PCB) 104 that extends into ground ring 105 between contact regions 46a and 46b towards the distal tip of connector 4. One or more integrated circuits (ICs), such as Application Specific Integrated Circuit (ASIC) chips 108a and 108b, can be operatively coupled to PCB 104 to provide information regarding mating connector 4 and the external device 2 (e.g. an accessory, such as a wired headset) of which the connector 4 is part of, and/or to perform specific functions, such as authentication, identification, contact configuration and current or power regulation.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while FIG. 1 depicts the resistor switch circuit 22 wherein the switch 18 is a single switch that serves to yield the two different pull down resistances R1 and R2, other more complex circuit are possible that may, for example, have more than two switches producing more than two different pull down resistances that are used with more than two different thresholds (of the comparator 15), to yield finer granularity in the liquid intrusion and leakage detection processes described above. The description is thus to be regarded as illustrative instead of limiting.

What is claimed is:

1. A method of protecting an external connector of an electronic device from corrosion while the electronic device is powered ON and connected to a second electronic device via the external connector, the external connector including first and second pins, the method comprising:
routing communication or control signals from a signal path within the electronic device through the first pin to the second electronic device;
interrupting the communication or control signals routed to the second electronic device and performing a connector contamination test by:
decoupling the first pin from the signal path and connecting the first pin to ground through a predetermined, first resistance;
measuring a voltage of the first pin while the first pin is un-driven except for being pulled to ground through the predetermined, first resistance, and the second pin has a DC or AC voltage thereon; and
comparing the voltage of the first pin to a predetermined threshold; and
if the voltage of the first pin exceeds the predetermined threshold, determining that the connector contamination test is positive and reducing a power supply voltage that results in reducing the DC or AC voltage on the second pin while the electronic device remains powered-on.

2. The method of claim 1 wherein the first pin is pulled to ground through the predetermined, first resistance which is at least one hundred times greater than resistance of an electrical termination specified for any communications bus of the electronic device.

3. The method of claim 1 wherein the electronic device includes context awareness of the device functionality, and wherein the liquid intrusion test is initiated in response to the context awareness functionality.

4. The method of claim 3 wherein the context awareness functionality indicates one of: a location of the electronic device based on a global positioning system output or a wireless local area network connection or a physical activity of a user of the device based on output from an inertial sensor in the device.

5. The method of claim 1 wherein the connector contamination detection test further includes:
if after comparing the voltage of the first pin to the predetermined threshold, the voltage of the first pin is less than the predetermined threshold, starting a timer and repeating the comparison step until either the connector contamination detection test is positive or the timer expires; and
if the timer expires without the connector contamination detection test registering positive, re-coupling the signal path to the first pin.

6. The method of claim 1 wherein an input of an analog to digital converter (ADC) is coupled to the first pin while measuring the voltage and the method further comprises:
decoupling the input of the ADC from the first pin and switching out the first resistance as a pull-down to ground so that the input of the ADC is un-driven except for being pulled to ground through a predetermined second resistance that is larger than the first resistance; and
measuring voltage of the input of the ADC and comparing the voltage to a predetermined leakage threshold.

7. The method of claim 6 wherein the predetermined second resistance is at least ten times greater than the first resistance.

8. The method of claim 6 wherein in response to the measured voltage on the input of the ADC exceeding the predetermined leakage threshold, asserting a detection error flag within a data storage location in the system.

9. The method of claim 1 further comprising:
in response to the voltage of the first pin exceeding the predetermined threshold, starting a timer; and
upon expiration of the timer, measuring voltage of the first pin, while a) the first pin is un-driven except for being pulled to ground through the predetermined, first resistance, and b) the second pin is being used to conduct electrical power into or out of the system, and in response to the voltage of the first pin exceeding a predetermined threshold, logging a solid contamination detected event within a data storage location in the system.

10. The method of claim 1 further comprising:
in response to the voltage of the first pin exceeding the predetermined threshold, starting a timer; and
upon expiration of the timer, measuring voltage of the first pin, while a) the first pin is un-driven except for being pulled to ground through the predetermined, first resistance, and b) the second pin is being used to conduct electrical power into or out of the system, and, in response to the voltage of the first pin being less than a predetermined threshold, logging a liquid contamination detected event within a data storage location in the system.

11. The method of claim 1 wherein the system is a portable device and the method further comprises:
in response to the voltage of the first pin exceeding the predetermined threshold, monitoring output data of an inertial sensor in the device; and
while the output data of the inertial sensor exceeds an activity threshold, measuring voltage of the first pin, while a) the first pin is un-driven except for being pulled to ground through the predetermined, first resistance, and b) the second pin is being used to conduct electrical power into or out of the device, and, in response to the voltage of the first pin being less than the predetermined threshold, logging a liquid contamination detected event within a data storage location in the device.

12. The method of claim 1 wherein the system is a portable device and the method further comprises:
in response to the voltage of the first pin exceeding the predetermined threshold, monitoring output data of an inertial sensor in the device; and
while the output data of the inertial sensor exceeds an activity threshold, measuring voltage of the first pin, while a) the first pin is un-driven except for being pulled to ground through the predetermined, first resistance, and b) the second pin being used to conduct electrical power into or out of the device, and, in response to the voltage of the first pin exceeding a predetermined threshold, logging a solid contamination detected event within a data storage location in the device.

13. An electronic device comprising:
an external connector including first and second pins and configured to be coupled to a corresponding connector of a second electronic device;
a signal path coupled to the first pin; and
a controller configured to route communication or control signals from the signal path through the first pin to the second electronic device and perform a contamination test by:
decoupling the first pin from the signal path and connecting the first pin to ground through a predetermined, first resistance;
measuring a voltage of the first pin while the second pin has a DC or AC voltage thereon and the first pin is un-driven except for being pulled to ground through the predetermined, first resistance; and
comparing the voltage of the first pin to a predetermined threshold; and
wherein the controller is further configured to, if the voltage of the first pin exceeds the predetermined threshold, determine that the contamination test is positive and reduce a power supply voltage that results in reducing the DC or AC voltage on the second pin while the electronic device remains powered-on.

14. The electronic device of claim 13 further comprising:
an analog to digital converter (ADC) having an input and an output;
a multiplexer having an output coupled to the first pin of the external connector, a first input coupled to the signal path, and a second input coupled to the input of the ADC;
a power converter to produce a power supply voltage;
a resistor switch circuit coupled to the input of the ADC and to ground, and controllable to selectively pull the input of the ADC to ground alternately through a predetermined, first resistance or a predetermined, second resistance; and
wherein the controller has an input coupled to the output of the ADC, and a plurality of outputs coupled to a control input of the power converter, a control input of the multiplexer, and a control input of the resistor switch circuit.

15. The electronic device of claim 14 wherein the controller is configured to simultaneously:
a) signal the multiplexer to route the first pin of the connector to the input of the ADC,
b) signal the resistor switch circuit to close so that the first pin is un-driven except for being pulled to ground through the first resistance, and c) compare voltage of the first pin to a predetermined threshold and, in response to the voltage of the first pin exceeding the predetermined threshold, signal the power converter to reduce the power supply voltage to a non-zero level, which proportionally reduces voltage on a second pin of the plurality of pins of the external connector while the system remains powered-on.

16. The electronic device of claim 15 wherein the controller is to, before a) or after c), simultaneously
   d) signal the multiplexer to decouple its second input from its output,
   e) signal the resistor switch circuit to open so that the input of the ADC is un-driven except for being pulled to ground through the predetermined, second resistance, and
   f) compare measured voltage of the input of the ADC to a predetermined leakage threshold, wherein in response to the measured voltage exceeding the predetermined leakage threshold, the controller is to assert a detection error flag within a data storage location in the system.

17. The electronic device of claim 14 wherein the predetermined second resistance is at least ten times greater than the first resistance.

18. The electronic device of claim 14 wherein the power converter comprises a power stage, a filter capacitor that couples an output of the power stage to ground, and a switch that shunts to ground the output of the power stage, under control of a pulse width modulation (PWM) generator, wherein the control input of the power converter is an input of the PWM generator.

19. The electronic device of claim 13 wherein the controller is to, in response to the voltage of the first pin exceeding the predetermined threshold, start a timer and, upon expiration of the timer, compare voltage of the first pin to a predetermined threshold, and in response to the voltage of the first pin exceeding the predetermined threshold, log a solid contamination detected event within a data storage location in the system.

20. The electronic device of claim 13 wherein the controller is to, in response to the voltage of the first pin exceeding the predetermined threshold, start a timer and, upon expiration of the timer, compare voltage of the first pin to a predetermined threshold, and in response to the voltage of the first pin being less than the predetermined threshold, log a liquid contamination detected event within a data storage location in the system.

21. The electronic device of claim 13 wherein the controller is to, in response to the voltage of the first pin exceeding the predetermined threshold, monitor output data of an inertial sensor in the system and then, while the output data of the inertial sensor exceeds an activity threshold, compare voltage of the first pin to a predetermined threshold, and then in response to the voltage of the first pin being less than the predetermined threshold, log a liquid contamination detected event within a data storage location in the system.

22. The electronic device of claim 13 wherein the controller is to, in response to the voltage of the first pin exceeding the predetermined threshold, monitor output data of an inertial sensor in the system and then, while the output data of the inertial sensor exceeds an activity threshold, compare voltage of the first pin to a predetermined threshold, and then in response to the voltage of the first pin exceeding the predetermined threshold, log a solid contamination detected event within a data storage location in the system.

23. The electronic device of claim 13 further comprising a battery, a global positioning system (GPS) receiver, an inertial sensor and a context awareness module as part of a portable device, wherein the context awareness module is to provide information on context awareness of the portable device, and wherein
   the controller is to perform a)-c) in response to the information on context awareness indicating one of a) what type of accessory is plugged into the external connector, b) location of the device based on output from the GPS receiver or a wireless local area network connection, or c) physical activity of a user of the device based on output from the inertial sensor in the device.

24. The electronic device of claim 13 wherein the controller is to compare voltage of the first pin to the predetermined threshold being a lower bound of a predetermined range, and wherein the controller is to log (i) a liquid contamination detected event when the voltage of the first pin falls within the range, and (ii) a solid contamination detection event when the voltage of the first pin is above the range.

25. The electronic device of claim 13 further comprising a power converter configured to produce the power supply voltage at the second pin of the external connector.

26. The electronic device of claim 13 wherein the predetermined, first resistance is at least one hundred times greater than resistance of an electrical termination specified for any communications bus.

* * * * *